United States Patent
Yoo et al.

(10) Patent No.: US 9,984,297 B2
(45) Date of Patent: May 29, 2018

(54) MOVING OBJECT DETECTION DEVICE AND OBJECT DETECTION METHOD

(71) Applicants: SK hynix Inc., Gyeonggi-do (KR); KWANGWOON UNIVERSITY INDUSTRY ACADEMIC COLLABORATION FOUNDATION, Seoul (KR)

(72) Inventors: Ji Sang Yoo, Seoul (KR); Gyu Cheol Lee, Seoul (KR)

(73) Assignees: SK Hynix Inc., Gyeonggi-do (KR); KWANGWOON UNIVERSITY INDUSTRY ACADEMIC COLLABORATION FOUNDATION, Seoul (KR)

( * ) Notice: Subject to any disclaimer, the term of this patent is extended or adjusted under 35 U.S.C. 154(b) by 191 days.

(21) Appl. No.: 14/960,125

(22) Filed: Dec. 4, 2015

(65) Prior Publication Data
US 2016/0358018 A1  Dec. 8, 2016

(30) Foreign Application Priority Data
Jun. 2, 2015 (KR) ........................ 10-2015-0078103

(51) Int. Cl.
G06K 9/00 (2006.01)
G06T 7/215 (2017.01)
G06T 7/269 (2017.01)
G06K 9/62 (2006.01)
H04N 13/00 (2018.01)

(52) U.S. Cl.
CPC ........ *G06K 9/00805* (2013.01); *G06K 9/6211* (2013.01); *G06T 7/215* (2017.01); *G06T 7/269* (2017.01); *G06T 2207/10021* (2013.01); *G06T 2207/30244* (2013.01); *G06T 2207/30261* (2013.01); *H04N 2013/0081* (2013.01)

(58) Field of Classification Search
CPC .. G06K 9/00805; G06K 9/6211; G06T 7/215; G06T 7/269; B60R 2300/105; B60R 2300/107
USPC ........................................................ 382/103
See application file for complete search history.

(56) References Cited

U.S. PATENT DOCUMENTS

| | | | |
|---|---|---|---|
| 9,224,060 B1* | 12/2015 | Ramaswamy | G06K 9/00912 |
| 2005/0100192 A1* | 5/2005 | Fujimura | G06K 9/00369 |
| | | | 382/103 |
| 2008/0199050 A1* | 8/2008 | Koitabashi | B60R 1/00 |
| | | | 382/107 |
| 2008/0211909 A1 | 9/2008 | Loos | |
| 2009/0169052 A1 | 7/2009 | Seki et al. | |
| 2010/0315505 A1 | 12/2010 | Michalke et al. | |

(Continued)

FOREIGN PATENT DOCUMENTS

| KR | 1020140007092 | 1/2014 |
|---|---|---|
| KR | 1020140048539 | 4/2014 |

*Primary Examiner* — Van D Huynh
(74) *Attorney, Agent, or Firm* — IP & T Group LLP (57) ABSTRACT

An object detection device may include: a candidate object selection unit suitable for selecting candidate objects from a stereo image transmitted from moving cameras; a global motion estimation unit suitable for estimating global motions representing movement of the moving cameras from the stereo image; and an object determination unit suitable for detecting a moving object from the stereo image based on the candidate objects and the global motions.

8 Claims, 10 Drawing Sheets
(5 of 10 Drawing Sheet(s) Filed in Color)

(56) References Cited

U.S. PATENT DOCUMENTS

| | | | |
|---|---|---|---|
| 2011/0298988 A1* | 12/2011 | Kawai | G06T 5/006 348/699 |
| 2013/0002866 A1* | 1/2013 | Hampapur | G06T 7/215 348/143 |
| 2013/0129148 A1* | 5/2013 | Nanri | G01C 21/3602 382/103 |
| 2014/0078313 A1* | 3/2014 | Son | G06T 7/2033 348/169 |

* cited by examiner

MOVING OBJECT DETECTION DEVICE AND OBJECT DETECTION METHOD

CROSS-REFERENCE TO RELATED APPLICATIONS

The present application claims priority of Korean Patent Application No. 10-2015-0078103, filed on Jun. 2, 2015, which is incorporated herein by reference in its entirety.

BACKGROUND

1. Field

Exemplary embodiments of the present invention relate to a moving object detection device and object detection method, and more particularly, to a device and method for detecting a moving object using a camera.

2. Description of the Related Art

Many people are injured or die from traffic accidents. Traffic accidents in which pedestrians collide with vehicles can be particularly dangerous. In order to reduce such traffic accidents, automobile manufacturers develop various types of pedestrian recognition technologies and apply the developed technologies to their vehicles. This may include collision avoidance systems that recognize pedestrians, bicycles, and other vehicles using radar and high-resolution cameras, and determine the likelihood of a collision to automatically stop the vehicle.

Pedestrian recognition technology must be able to handle various situations. For instance, multiple moving objects must be detected and analyzed to determine when and when not to activate breaking.

Korean Patent Publication No 2014-0048539 has disclosed a technology for tracing an object using an image acquired from a camera. However, the patent has not disclosed a method for tracing an object when the camera is moving.

SUMMARY

Various embodiments are directed to an object detection device and object detection method which is capable of detecting a moving object in front while a moving body having cameras installed therein is moving.

In an embodiment, an object detection device may include: a candidate object selection unit suitable for selecting candidate objects from a stereo image transmitted from moving cameras; a global motion estimation unit suitable for estimating global motions representing movement of the moving cameras from the stereo image; and an object determination unit suitable for detecting a moving object from the stereo image based on the candidate objects and the global motions.

In an embodiment, an object detection method may include: selecting candidate objects from a stereo image transmitted from moving cameras; estimating global motions representing movement of the moving cameras from the stereo image; and detecting a moving object from the stereo image based on the candidate objects and the global motions.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Various embodiments will be described below more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Figure 1:
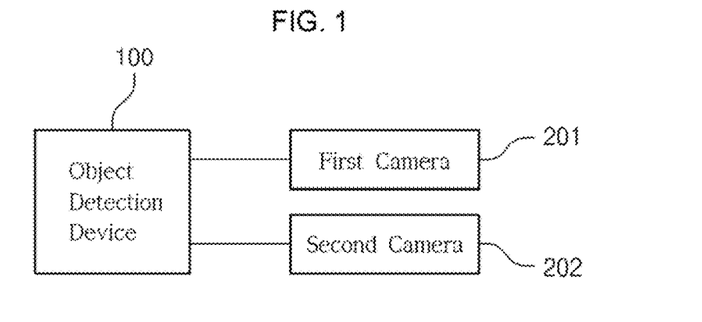
FIG. 1 illustrates an object detection system in accordance with an embodiment of the present invention.

FIG. 1 illustrates an object detection system in accordance with an embodiment of the present invention. Referring to FIG. 1, the object detection system may include an object detection device 100 and two cameras 201 and 202.

The two cameras 201 and 202 may be installed in a moving body, for example, a vehicle. The two cameras 201 and 202 may be installed in the same direction, take a stereo image of the same object, and transmit the taken stereo image to the object detection device 100. The cameras 201 and 202 may be connected to the object detection device 100 in a wired or wireless manner.

The object detection device 100 may analyze the stereo image transmitted from the two cameras 201 and 202, and detect a moving object in front of the two cameras 201 and 202 among objects in the stereo image. That is, even while the body is moving, the object detection device 100 may take the stereo image of the objects, detect the moving object among the objects, and estimate a direction in which the moving object moves.

As such, the object detection system in accordance with the embodiment of the present invention may detect the moving object in front of the system among objects in the stereo image taken from the moving body even while the moving body moves. Thus, the object detection system may estimate the direction of the moving object, and prevent the moving body from colliding with the moving object.

Figure 2:
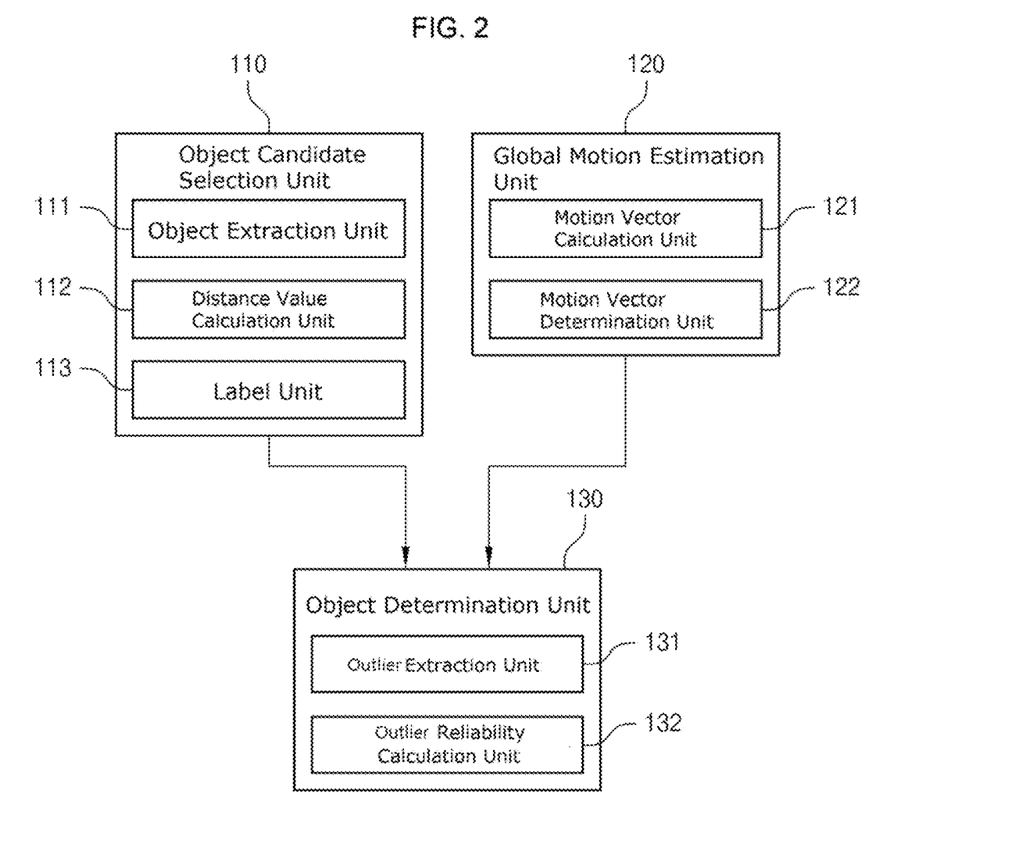
FIG. 2 illustrates an object detection device illustrated in FIG. 1.

FIG. 2 illustrates the object detection device 100 illustrated in FIG. 1. Referring to FIG. 2, the object detection device 100 may include a candidate object selection unit 110, a global motion estimation unit 120, and an object determination unit 130.

The candidate object selection unit 110 may receive the stereo image transmitted from the two cameras 201 and 202, and select candidate objects for detecting the moving object in front of the system.

The candidate object selection unit 110 may include an object extraction unit 111, a distance value calculation unit 112, and a label unit 113.

The object extraction unit 111 may convert the stereo image generated by the two cameras 201 and 202 into a disparity image, and extract objects from the disparity image. The object extraction unit 111 may extract objects through a histogram. That is, the object extraction unit 111 may analyze the image through the histogram, and extract objects from the disparity image.

In the stereo image, an object may be shown in both the left view-point image and the right view-point image. The disparity image may show the distance between two pixels of the respective two view-point images representing the same object as a pixel value.

Figure 3:
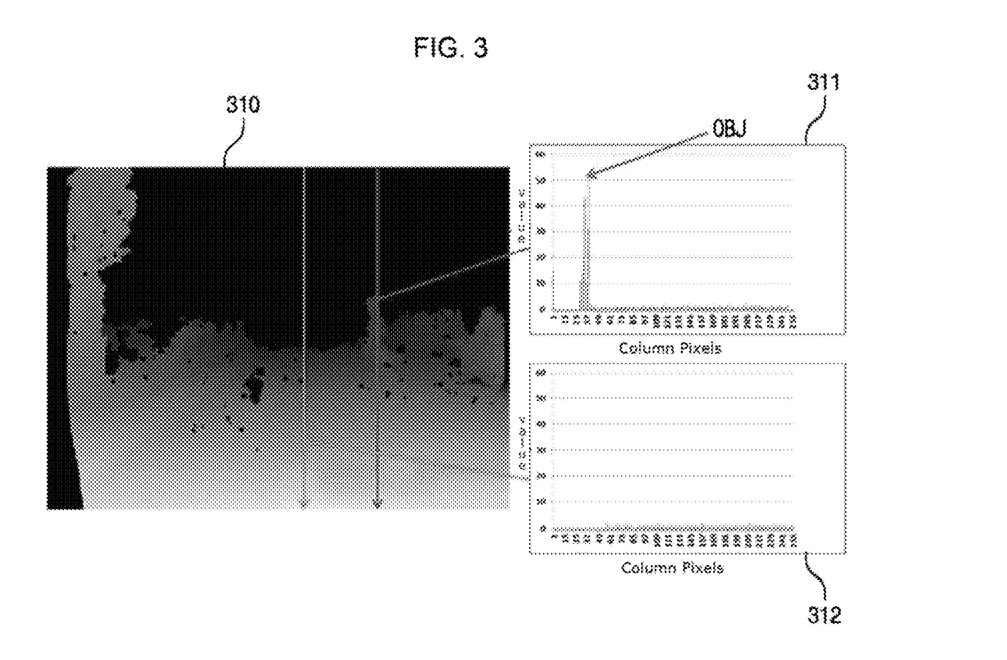
FIG. 3 illustrates a disparity image and histograms.

FIG. 3 illustrates the disparity image 310 and histograms 311 and 312. As illustrated in FIG. 3, as a histogram analysis result, when an object exists in a column of the stereo image, many pixels of the object having the disparity value OBJ and values around the object may appear in the histogram (311). On the other hand, when no object exists in a column of the stereo image, few pixels having the disparity vale OBJ and values around the object may appear in the histogram (312).

As such, the object extraction unit 111 may analyze the stereo image using histograms, and compare the disparity value of an object with the threshold value of the object. According to the comparison result, the object extraction unit 111 may extract the object having the disparity value greater than or equal to the threshold value.

In FIG. 3, when only a background such as a road exists in the stereo image, the histogram may show uniform value for the entire range. On the other hand, when an object exists as well as the background in the stereo image, the histogram may show different values of the object from the background.

The distance value calculation unit 112 may receive the information on the objects from the object extraction unit 111, and calculate distance values of the objects from a depth image or the disparity image. The distance values may represent numeral distances between the cameras 201 and 202 and the objects.

Figure 4:
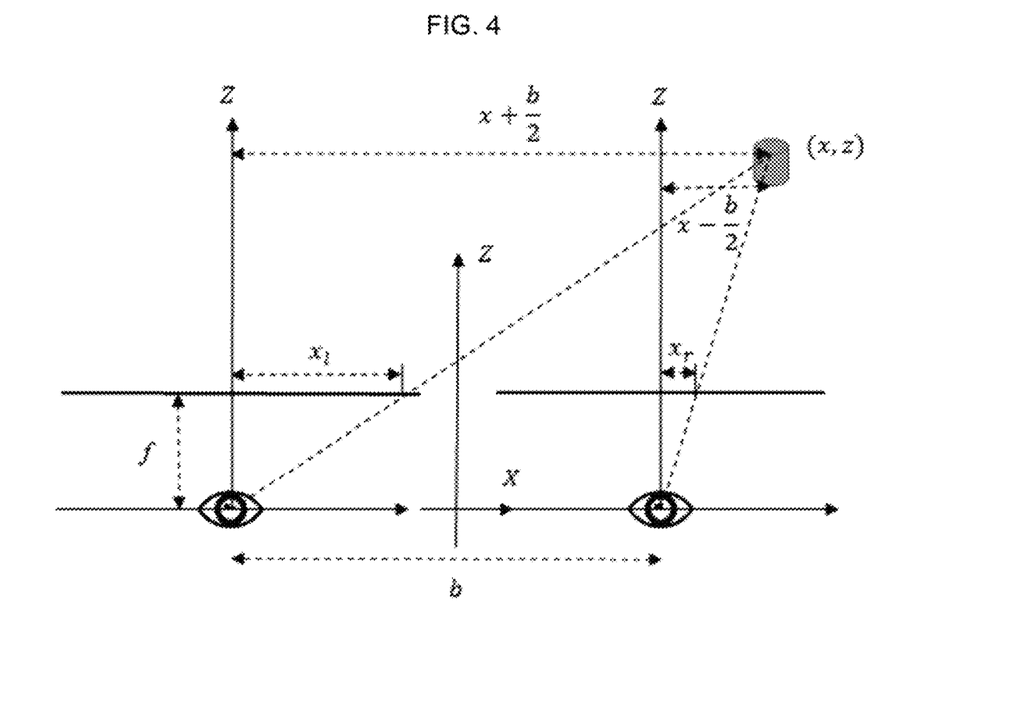
FIG. 4 illustrates parameters for calculating distance values of objects.

FIG. 4 illustrates parameters for calculating the distance values of the objects.

The depth value of an object may be calculated through a disparity value, a distance between the cameras, and a focal distance, and be expressed as Equation 1 below.

$$\frac{x_l}{f} = \frac{x + \frac{b}{2}}{z}, \frac{x_r}{f} = \frac{x - \frac{b}{2}}{z}$$ [Equation 1]

In Equation 1, "$x_l$" represents the coordinate of the left view-point image taken by a left camera of the two cameras 201 and 202, and "$x_r$" represents the coordinate of the right view-point image taken by right camera of the two cameras 201 and 202. Furthermore, "f" represents the focal distance of the two cameras 201 and 202, "b" represents a distance between the two cameras 201 and 202, and "z" represents a distance between the cameras 201 and 202 and an object. Equations 2 and 3 below may be derived from Equation 1. The relation between the disparity value and the depth value of the object may be represented from Equation 2, and the distance values between the cameras 201 and 202 and the object may be acquired from Equation 3.

$$\frac{x_l - x_r}{f} = \frac{d}{b} = \frac{b}{z}$$ [Equation 2]

$$z = \frac{fb}{d}$$ [Equation 3]

The distance value calculation unit 112 may compare the distance value with a predetermined value. According to the comparison result, the distance value calculation unit 112 may detect a candidate object having the distance value less than or equal to the predetermined value.

The label unit 113 may mark labels on the candidate objects detected by the distance value calculation unit 112. For example, the label unit 113 may mark box-shaped labels with different numerals and colors on the candidate objects.

Through the disparity image, various candidate objects such as signs, trees, and buildings as well as vehicles and pedestrians may be extracted.

Figure 5A:
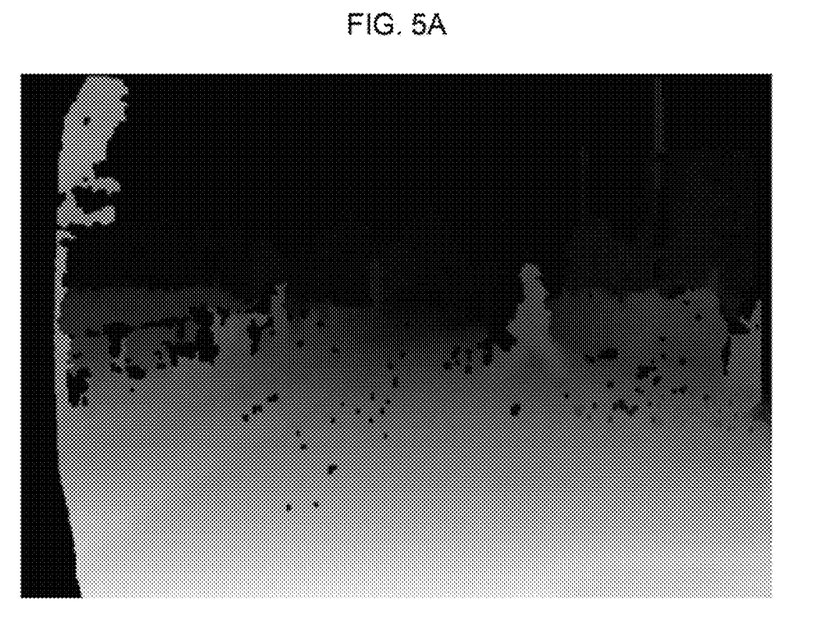
FIG. 5A illustrates a disparity image converted from a stereo image.
Figure 5B:
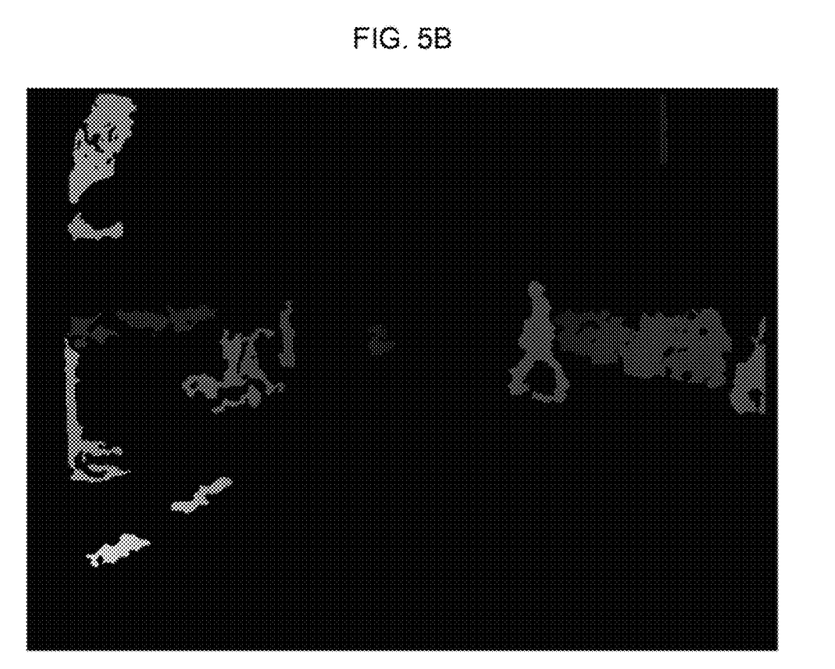
FIG. 5B illustrates a disparity image analyzed by histograms.
Figure 5C:
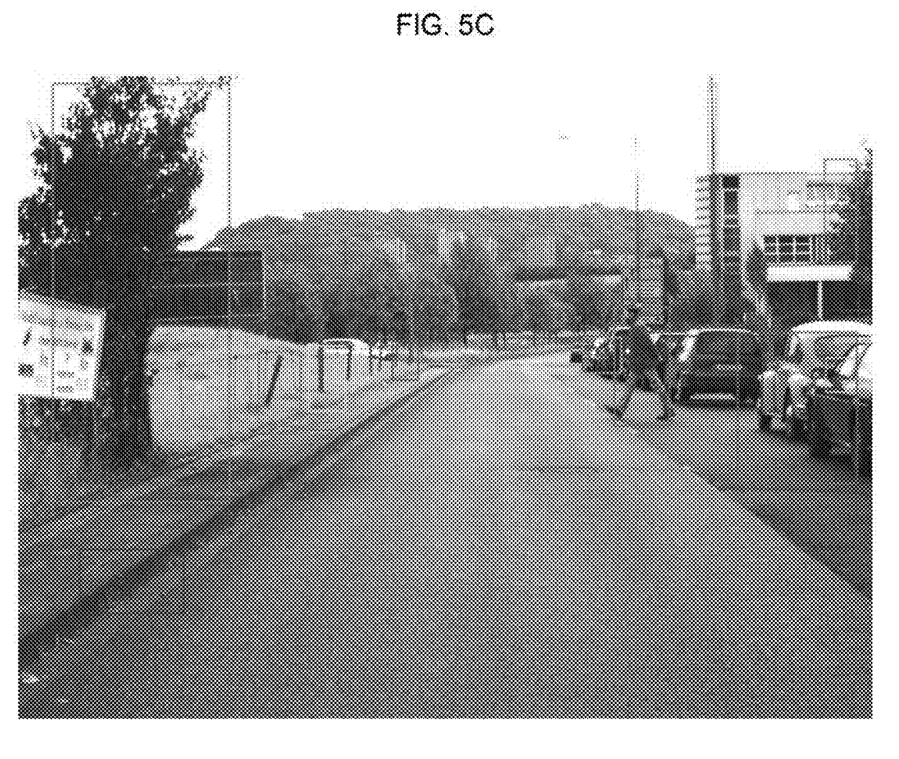
FIG. 5C illustrates an image of candidate objects marked with labels.

FIG. 5A illustrates the disparity image converted from a stereo image, FIG. 5B illustrates the disparity image analyzed by the histograms, and FIG. 5C illustrates an image of the candidate objects marked with labels.

With the stereo image from the two cameras 201 and 202, the object detection system may easily extract candidate objects by recognizing the environment around the cameras. That is, the object detection system can obtain a more precise result than a system which detects an object using a single image taken by one camera.

The global motion estimation unit 120 may estimate a global motion representing a motion of the moving body having the cameras 201 and 202. That is, the global motion estimation unit 120 may allow the object detection system to distinguish between a local motion representing motion of the object, and a global motion representing motion of the moving body.

The global motion estimation unit 120 may include a motion vector detection unit 121 and a motion vector determination unit 122.

The motion vector detection unit 121 may calculate a motion vector using the Random Sample Consensus (RANSAC).

The global motion estimation unit 120 may acquire global motion through the Structure From Motion (SFM). That is, through the SFM, the global motion estimation unit 120 may acquire rectilinear motions for the respective axes such as an x-axis motion (pitch), a y-axis motion (roll), and a z-axis motion (yaw), and rotational motions for the respective axes such as an x-axis rotation (lateral), a y-axis rotation (longitudinal), and a z-axis rotation (yaw). The SFM may be defined as Equation 4 below.

$$\begin{bmatrix} u \\ v \end{bmatrix} = \frac{1}{Z} \begin{bmatrix} -f & 0 & x \\ 0 & -f & y \end{bmatrix} \begin{bmatrix} T_x \\ T_y \\ T_z \end{bmatrix} +$$ [Equation 4]

-continued $$\frac{1}{f} \begin{bmatrix} xy & -(f^2+x^2) & fy \\ f^2+y^2 & -xy & -fx \end{bmatrix} \begin{bmatrix} W_x \\ W_y \\ W_z \end{bmatrix}$$

In Equation 4, "x" and "y" represent the coordinates of an image, and "u" and "v" represent motion vectors of the corresponding coordinates. Furthermore, "$T_x$", "$T_y$", and "$T_z$" represent the rectilinear motions of the moving body, and "$W_x$", "$W_y$", and "$W_z$" represent the rotational motions of the moving body. Furthermore, "f" represents the focal distance of the two cameras 201 and 202, and "Z" represents the actual distance between the two cameras 201 and 202 and a corresponding point.

Since Equation 4 includes six unknown quantities, the calculation is complex. However, when the moving body is a vehicle, the motions of the moving body can be simplified into the z-axis rectilinear motion, the x-axis rotational motion, and the y-axis rotational motion. Equation 5 defines the relation among the z-axis rectilinear motion, the x-axis rotational motion, and the y-axis rotational motion in the vehicle system.

$$\begin{bmatrix} u \\ v \end{bmatrix} = \begin{bmatrix} \frac{x}{Z} & \frac{xy}{f} & -\frac{(f^2+y^2)}{f} \\ \frac{y}{Z} & \frac{f^2+y^2}{f} & -\frac{xy}{f} \end{bmatrix} \begin{bmatrix} T_z \\ W_z \\ W_y \end{bmatrix} \quad \text{[Equation 5]}$$

Equation 6 is an equation obtained by multiplying a reversed function by both sides, in order to calculate the global motion in the right side of Equation 5.

$$\begin{bmatrix} T_z \\ W_z \\ W_y \end{bmatrix} = \begin{bmatrix} \frac{x}{Z} & \frac{xy}{f} & -\frac{(f^2+y^2)}{f} \\ \frac{y}{Z} & \frac{f^2+y^2}{f} & -\frac{xy}{f} \end{bmatrix}^{-1} \begin{bmatrix} u \\ v \end{bmatrix} \quad \text{[Equation 6]}$$

The motion vector of the corresponding coordinate may be acquired through the Lucas-Kanade optical flow. The acquired motion vector may be divided into a global motion vector generated from the global motion and a local motion vector generated from the local motion. The global motion may be acquired from a fixed object such as a tree or building in the image, due to the motion of the moving body. The local motion may be acquired from an actual moving object such as a walking pedestrian or another moving vehicle. When the global motion is calculated through the local motion vector generated from the local motion, an incorrect result may be obtained. Thus, under the supposition that a number of the global motions are greater than a number of the local motions in the image, the global motion estimation unit 120 may perform global motion estimation through the RANSAC. Since the RANSAC can estimate a relatively correct model even when the model has an error which significantly deviates, the RANSAC may be suitably applied to a model in which a large number of global motions and a small number of local motions are included in the image.

The method for acquiring a global motion using the RANSAC will be described as follows.

At a first step, three sample data may be randomly acquired from motion vectors extracted at feature points.

At a second step, the sample data may be substituted into Equation 6 to calculate the global motion parameters "$T_z$", "$W_x$", and "$W_y$". The global motion parameters may be substituted into Equation 5 to acquire motion vectors for the respective feature points.

At a third step, an error of the global motion parameters for the sample data may be calculated through Equation 7.

$$e = \sum_{p \in I} |u'_p - u_p| + |v'_p - v_p| \quad \text{[Equation 7]}$$

In Equation 7, "p" represents the feature point extracted from the image, and "I" represents all feature points within the image. Furthermore, "$u_p'$" and "$v_p'$" represent motion vectors acquired by substituting the global motion parameters into Equation 5, and "$u_p$" and "$v_p$" represent motion vectors acquired through the Lucas-Kanade optical flow.

The error "e" may indicate a value obtained by adding up the absolute values of differences between two vectors at all feature points.

When a currently acquired error is smaller than a previous error, that is, when the error falls within a predetermined range, the motion vector determination unit 122 may determine that the reliability of the current global motion is high, and finally determine the global motion while repeating the above-described steps many times.

Figure 6A:
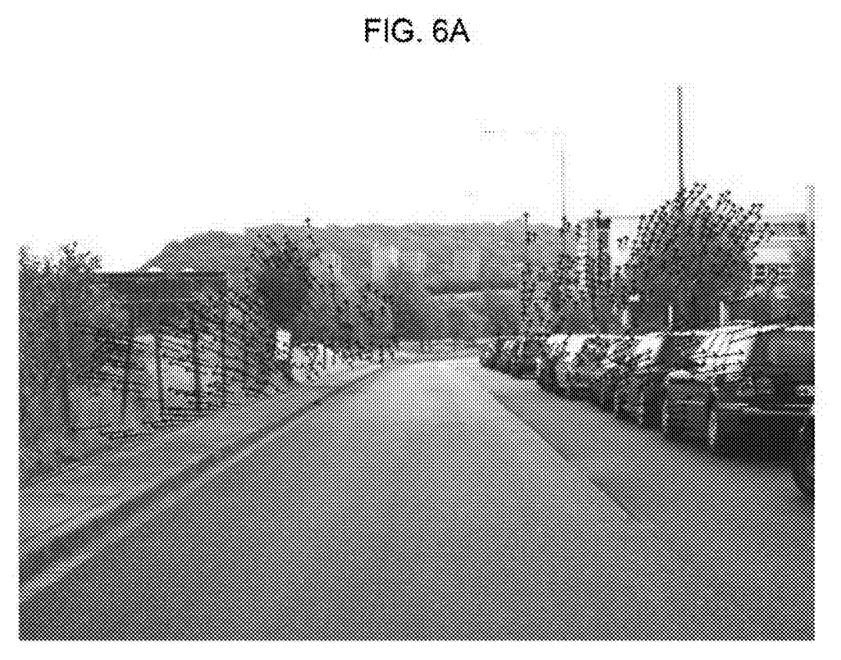
FIG. 6A illustrates an image with motion vectors extracted through the Lucas-Kanade optical flow.
Figure 6B:
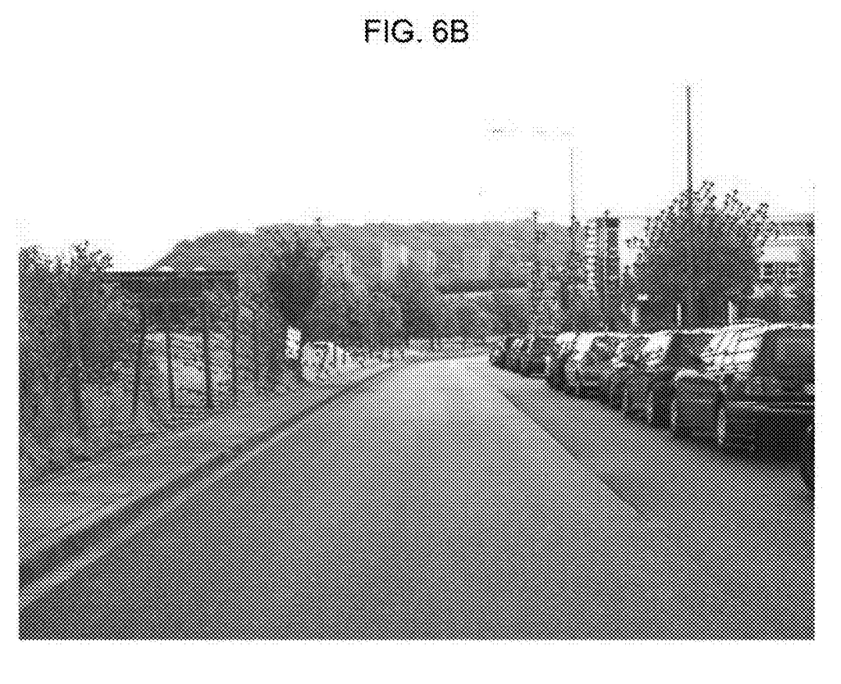
FIG. 6B illustrates an image with global motion vectors estimated through the RANSAC.

FIGS. 6A and 6B are images with the motion vectors estimated through RANSAC. FIG. 6A illustrates an image with motion vectors extracted through the Lucas-Kanade optical flow, and FIG. 6B illustrates an image with the global motion vectors acquired by substituting global motion parameters calculated through the RANSAC into Equation 5.

Referring to FIGS. 6A and 6B, the results of the Lucas-Kanade optical flow may coincide with the global motion vectors estimated through the RANSAC, which indicates the effectiveness of the RANSAC.

The object determination unit 130 may be connected to the candidate object selection unit 110 and the global motion estimation unit 120, may receive information on the candidate objects from the candidate object selection unit 110, may receive the global motion information from the global motion estimation unit 120, and may detect the moving object. When the ratio of outliers with respect to all feature points of each candidate object is greater than or equal to 0.5, the object determination unit 130 may determine that the corresponding object is the moving object. The object determination unit 130 may include an outlier extraction unit 131 and an outlier reliability calculation unit 132.

The outlier extraction unit 131 may extract the outliers of an object. An outlier may refer to an observed value which significantly deviates from the data distribution. Among all motion vectors of an image taken at the moving body, the global motion vectors of the global motion may occupy a large proportion of all motion vectors of the image, and the local motion vectors of the local motion may occupy a small proportion of all motion vectors of the image. Thus, the local motion vectors of the local motion may be determined as the outliers.

Figure 7:
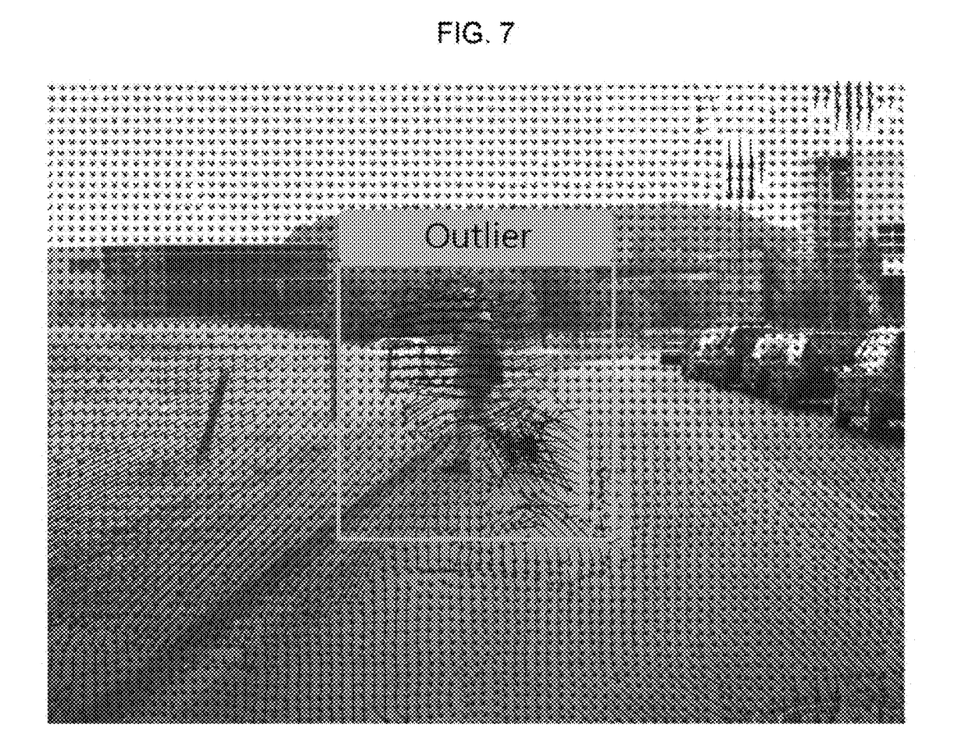
FIG. 7 is an image with motion vectors extracted through the Lucas-Kanade optical flow.

FIG. 7 is an image with the motion vectors extracted through the Lucas-Kanade optical flow. FIG. 7 exemplarily illustrates that the local motion vectors around a walking pedestrian in the middle of the image exhibit a large difference from surrounding global motion vectors. Such a region of the local motion vector may be defined as outliers.

The outlier may be detected through comparison between the global motion vectors of the global motions and all motion vectors acquired through the Lucas-Kanade optical flow. That is, the outliers or the local motion vectors may be detected from the difference between the global motion vectors for all points and all motion vectors obtained through the Lucas-Kanade optical flow.

Figure 8A:
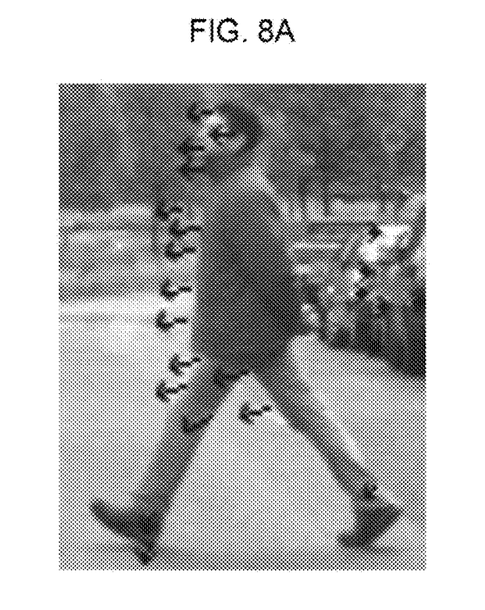
FIG. 8A is an image with local motion vectors extracted through the Lucas-Kanade optical flow.
Figure 8B:
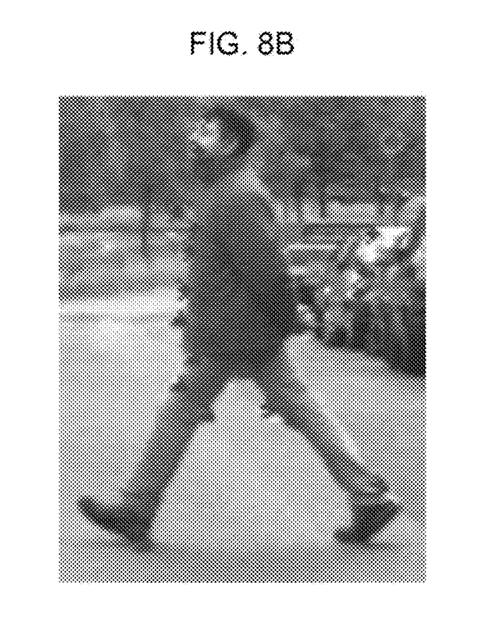
FIG. 8B is an image with global motion vectors estimated through the RANSAC.

FIG. 8A is an image with the local motion vectors extracted through the Lucas-Kanade optical flow, and FIG. 8B is an image with the global motion vectors estimated through the RANSAC. The image of FIG. 8A shows that local motions vectors are extracted along the moving direction of a pedestrian. FIG. 8B shows the global motion vectors with ignorance of the local moving vectors according to the RANSAC estimating only the global motion vectors.

Figure 9:
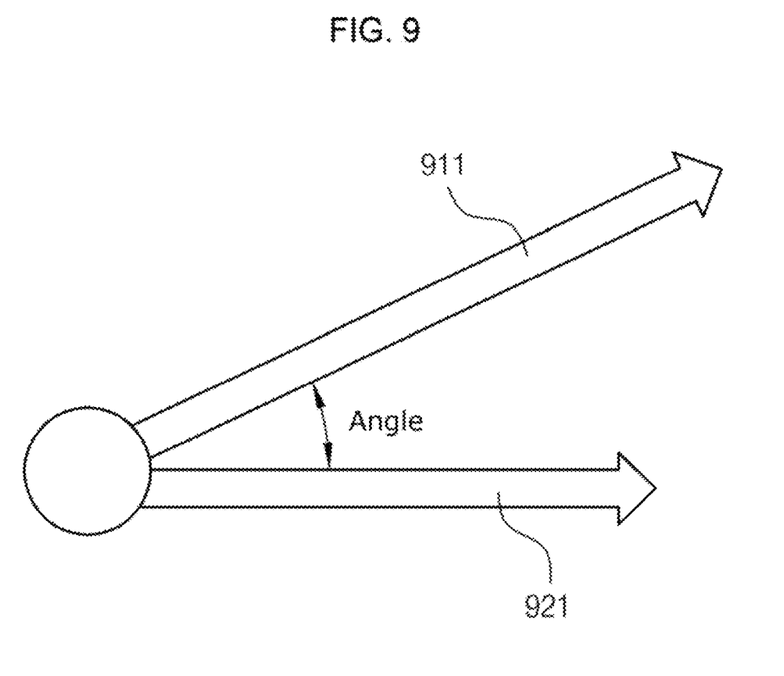
FIG. 9 illustrates a global motion vector estimated through the RANSAC and a motion vector estimated through the Lucas-Kanade optical flow.

FIG. 9 illustrates the global motion vector estimated through the RANSAC and the local motion vector estimated through the Lucas-Kanade optical flow.

Referring to FIG. 9, when there is no large difference between a global motion vector 921 estimated through the RANSAC and a motion vector 911 acquired through the Lucas-Kanade optical flow, the corresponding motion vector may be considered as the global motion. When there is a large difference therebetween, the corresponding motion vector may be considered as the local motion vector or the outlier.

When the ratio of the outliers with respect to all feature points of each candidate object is greater than or equal to 0.5, the outlier reliability calculation unit 132 may determine that the corresponding object is the moving object.

The outlier reliability calculation unit 132 may detect the moving object by calculating reliability of the outliers. It may be wrong when a candidate object having even one outlier is determined as the moving object. In order to prevent such erroneous determinations, the outlier reliability calculation unit 132 may analyze the reliability of the outliers within the label representing the candidate object.

Figure 10A:
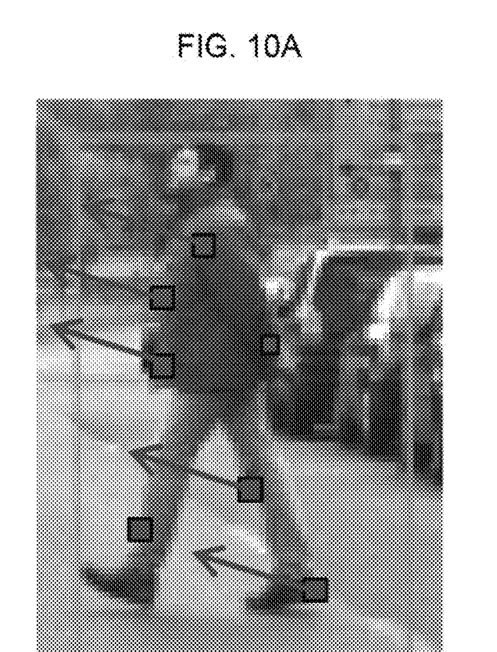
FIG. 10A illustrates a moving object having outliers.
Figure 10B:
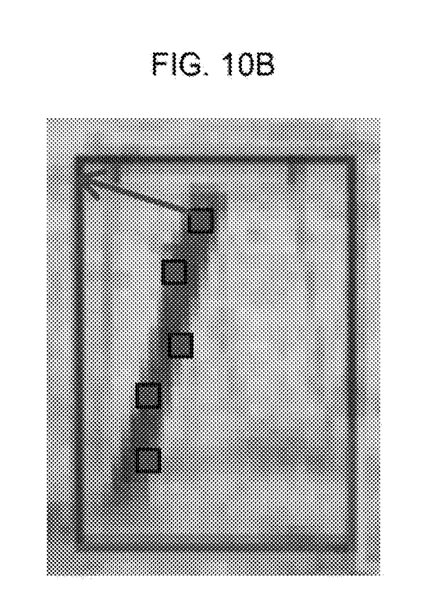
FIG. 10B illustrates a stationary object having an outlier.

FIGS. 10A and 10B show candidate objects, one of which is a moving object and the other one of which is stationary object. FIG. 10A illustrates the moving object having outliers indicated by several arrows out of all feature points within the label representing the moving object, and FIG. 10B illustrates the stationary object having an outlier indicated by a single arrows out of all feature points within the label representing the stationary object.

In FIG. 10B, even though the stationary object has a single outlier within the label, the stationary object cannot be determined as a moving object. Thus, the ratio of the outliers within the label may be calculated to reflect reliability. Equation 8 is an equation for calculating the reliability of the outliers within the label.

$$R_{outlier} = \frac{N_{outlier}}{N_{inlier} + N_{outlier}} > 0.5 \quad \text{[Equation 8]}$$

In Equation 8, "$N_{outlier}$" and "$N_{inlier}$" represent the number of outliers and the number of normal points, respectively, out of all feature points within the label. When the ratio of the outliers within the label is greater than 0.5, the candidate object corresponding to the label may be determined as the moving object.

As described above, the object detection system may acquire a stereo image using the two cameras 201 and 202, and analyze the stereo image to detect a moving object in front even while a moving body having the object detection device 100 is moving. Then, the object detection system may estimate the moving direction of the moving object and thus prevent the moving body from colliding with the moving object.

Figure 11:
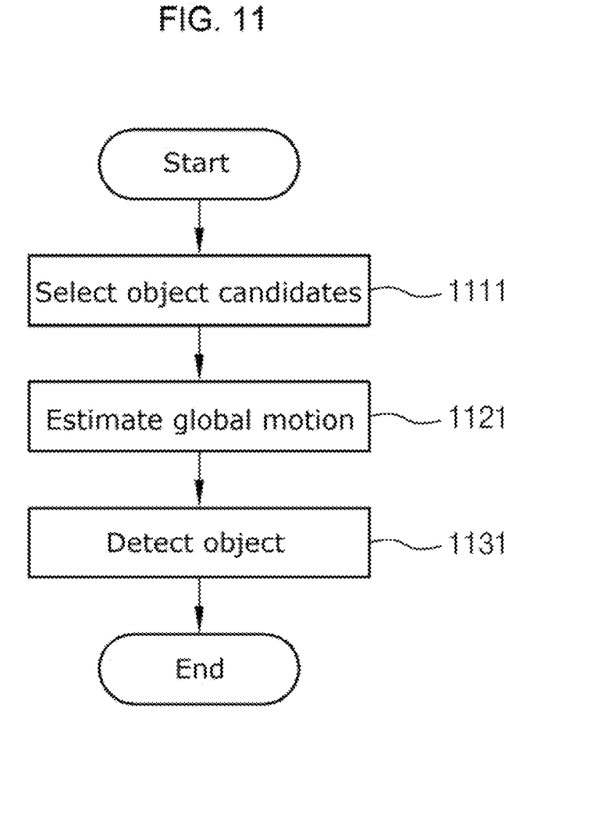
FIG. 11 is a flowchart illustrating an object detection method in accordance with an embodiment of the present invention.

FIG. 11 is a flowchart illustrating an object detection method in accordance with an embodiment of the present invention. Referring to FIG. 11, the object detection method may include first to third steps 1111 to 1131. Referring to FIG. 1, the object detection method of FIG. 11 is as follows.

At the first step 1111, the object detection device 100 may receive images transmitted from the two cameras 201 and 202, and select candidate objects for detecting a moving object among objects in front of the cameras 201 and 202 from the images.

At the second step 1121, the object detection device 100 may estimate the global motion of the moving body having the cameras 201 and 202 through the RANSAC. That is, the global motion estimation unit 120 may estimate the global motion representing motion of the moving body from all motions in the image thereby dividing the local motion representing motion of the object, and the global motion. The global motion may be estimated through the RANSAC.

At the third step 1131, the object detection device 100 may detect the moving object using the information on all candidate objects and the global motion information.

As described above, the object detection method in accordance with the embodiment of the present invention may detect the moving object using global motion information. Even while the moving body having the object detection device 100 is moving, the object detection method may detect the moving object in front, estimate the moving direction of the object, and prevent the moving body from colliding with the moving object.

Although various embodiments have been described for illustrative purposes, it will be apparent to those skilled in the art that various changes and modifications may be made without departing from the spirit and scope of the invention as defined in the following claims.

What is claimed is:

1. An object detection device comprising:
   a candidate object selection unit suitable for converting a stereo image transmitted from moving cameras into a disparity image, and selecting pixels having a disparity value greater than a threshold value in histogram of the disparity image as candidate objects;
   a global motion estimation unit suitable for calculating motion vectors for coordinates of the stereo image through optical flow, and estimating global motions representing movement of the moving cameras through sample data extracted from the motion vectors; and
   an object determination unit suitable for extracting outliers from difference between global motion vectors calculated through the global motions estimated by the global motion estimation unit and the motion vectors calculated through the optical flow, and detecting a candidate object having a ratio of outliers greater than a predetermined ratio among the candidate objects selected by the candidate object selection unit as a moving object.

2. The object detection device of claim 1, wherein the candidate object selection unit includes:
   an object extraction unit suitable for converting the stereo image into the disparity image, and extracting pixels having the disparity value greater than the threshold value in histogram of the disparity image as objects; and a distance value calculation unit suitable for calculating distance values of the extracted objects through the disparity image, and selecting the candidate objects among the extracted objects, the distance values of which are less than or equal to a predetermined value.

3. The object detection device of claim 2, wherein the candidate object selection unit further includes a label unit suitable for marking a label on each of the candidate objects.

4. The object detection device of claim 1, wherein the global motion estimation unit includes:

a motion vector calculation unit suitable for calculating motion vectors for coordinates of the stereo image through the optical flow; and a motion vector determination unit suitable for calculating vector errors from the motion vectors, and estimating the global motions using the sample data extracted from the motion vectors, the vector errors of which fall within a preset range.

5. The object detection device of claim 4, wherein the motion vector calculation unit calculates the motion vectors using Random Sample Consensus (RANSAC).

6. The object detection device of claim 1, wherein the object determination unit includes:

an outlier extraction unit suitable for extracting outliers of the candidate objects from the difference between the global motion vectors and the motion vectors; and an outlier reliability calculation unit suitable for detecting the candidate object having the ratio of outliers greater than the predetermined ratio among the candidate objects as the moving object.

7. An object detection method comprising:

converting a stereo image transmitted from moving cameras into a disparity image by a candidate object selection unit;

selecting pixels having a disparity value greater than a threshold value in histogram of the disparity image as candidate objects by the candidate object selection unit;

calculating motion vectors for coordinates of the stereo image through optical flow by a global motion estimation unit;

estimating global motions representing movement of the moving cameras through sample data extracted from the motion vectors by the global motion estimation unit;

extracting outliers from difference between global motion vectors calculated through the global motions and the motion vectors calculated through the optical flow by an object determination unit; and detecting a candidate object having a ratio of outliers greater than a predetermined ratio among the candidate objects as a moving object by the object determination unit.

8. The object detection device of claim 7, wherein the global motions are estimated through Random Sample Consensus (RANSAC).

* * * * *